US012744837B2

(12) United States Patent
Valcore et al.

(10) Patent No.: US 12,744,837 B2
(45) Date of Patent: Sep. 22, 2026

(54) SYSTEMS AND METHODS FOR COMPRESSING A SENSOR-BASED SIGNAL

(71) Applicant: Lam Research Corporation, Fremont, CA (US)

(72) Inventors: John C. Valcore, Worthington, OH (US); Adrian Esteban Sapio, Spicewood, TX (US)

(73) Assignee: Lam Research Corporation, Fremont, CA (US)

( * ) Notice: Subject to any disclaimer, the term of this patent is extended or adjusted under 35 U.S.C. 154(b) by 108 days.

(21) Appl. No.: 18/867,601

(22) PCT Filed: May 18, 2023

(86) PCT No.: PCT/US2023/022789

§ 371 (c)(1),
(2) Date: Nov. 20, 2024

(87) PCT Pub. No.: WO2023/239541

PCT Pub. Date: Dec. 14, 2023

(65) Prior Publication Data

US 2026/0122146 A1 Apr. 30, 2026

Related U.S. Application Data

(60) Provisional application No. 63/350,331, filed on Jun. 8, 2022.

(51) Int. Cl.
*H04L 69/04* (2022.01)

(52) U.S. Cl.
CPC .................................. *H04L 69/04* (2013.01)

(58) Field of Classification Search
None
See application file for complete search history.

(56) References Cited

U.S. PATENT DOCUMENTS

| | | | | |
|---|---|---|---|---|
| 8,581,597 | B2 | 11/2013 | Coumou | |
| 2004/0225462 | A1 | 11/2004 | Renken et al. | |
| 2017/0200592 | A1* | 7/2017 | Valcore, Jr. ....... | H01J 37/32935 |
| 2023/0207267 | A1 | 6/2023 | Valcore, Jr. et al. | |
| 2023/0245872 | A1 | 8/2023 | Daly et al. | |
| 2023/0282465 | A1 | 9/2023 | Valcore, Jr. et al. | |
| 2024/0045399 | A1* | 2/2024 | Chai ................. | G05B 19/4099 |

OTHER PUBLICATIONS

ISR & WO PCT/US2023/022789, dated Sep. 12, 2023, 8 pages.

* cited by examiner

*Primary Examiner* — Boris D Grijalva Lobos
(74) *Attorney, Agent, or Firm* — Polygon IP, LLP

(57) ABSTRACT

A method for compressing a sensor-based signal is described. The method includes receiving the sensor-based signal and dividing the sensor-based signal into a plurality of portions. Each portion is generated according to a corresponding cycle of a clock signal. The method further includes identifying a plurality of states of each portion of the sensor-based signal and dividing sensor state data for one of the plurality of states into a parameter list and a difference component. The parameter list includes a value common to all of the sensor state data for the one of the plurality of states, and the difference component includes a plurality of values that are offsets from the common value. The method includes packetizing the parameter list within a header of a packet and the difference component within a payload of the packet to compress the sensor state data.

20 Claims, 6 Drawing Sheets

(System)

FIG. 1 (System)

FIG. 2 (Transmitter)

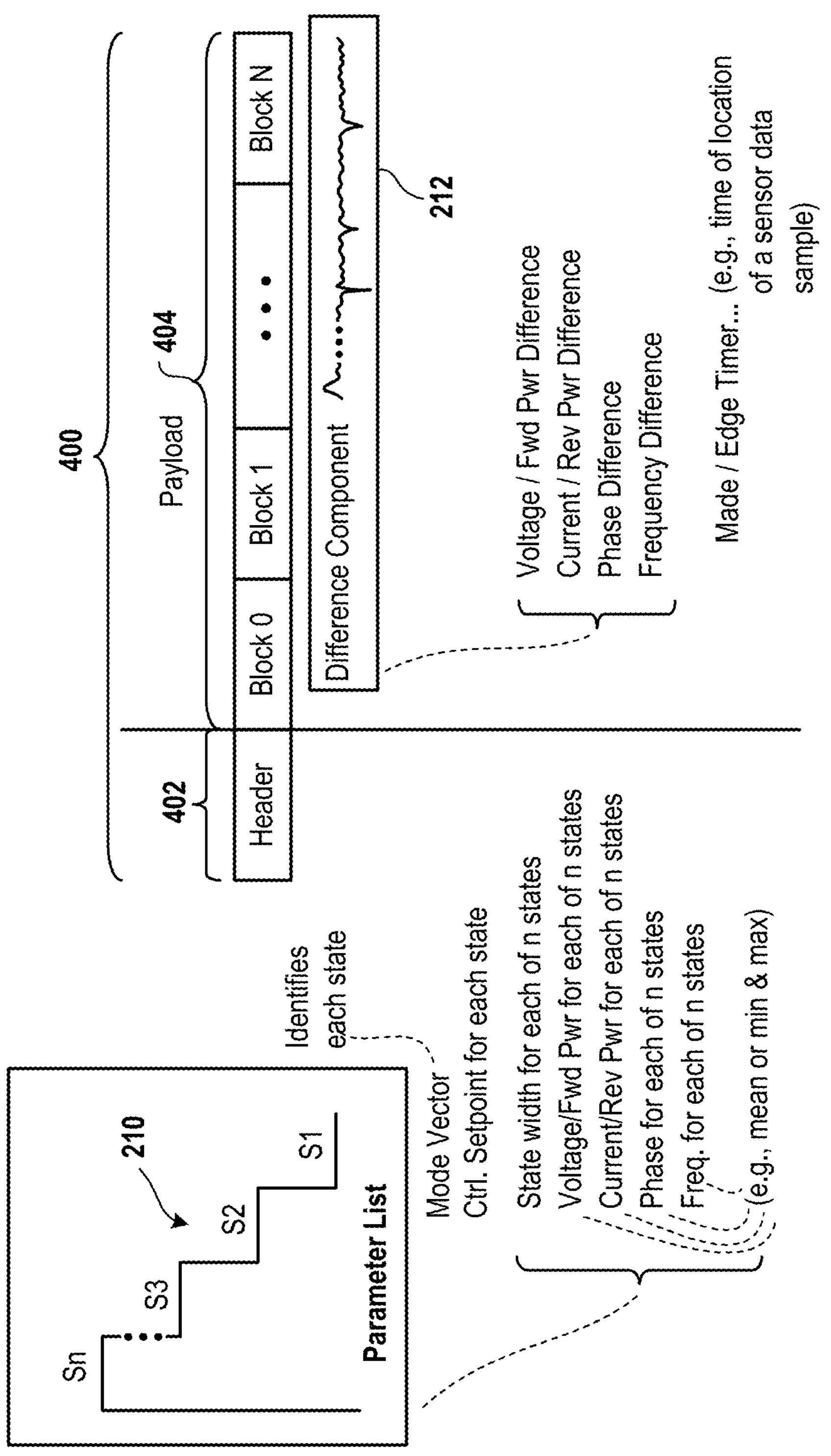
FIG. 4 (Packet)

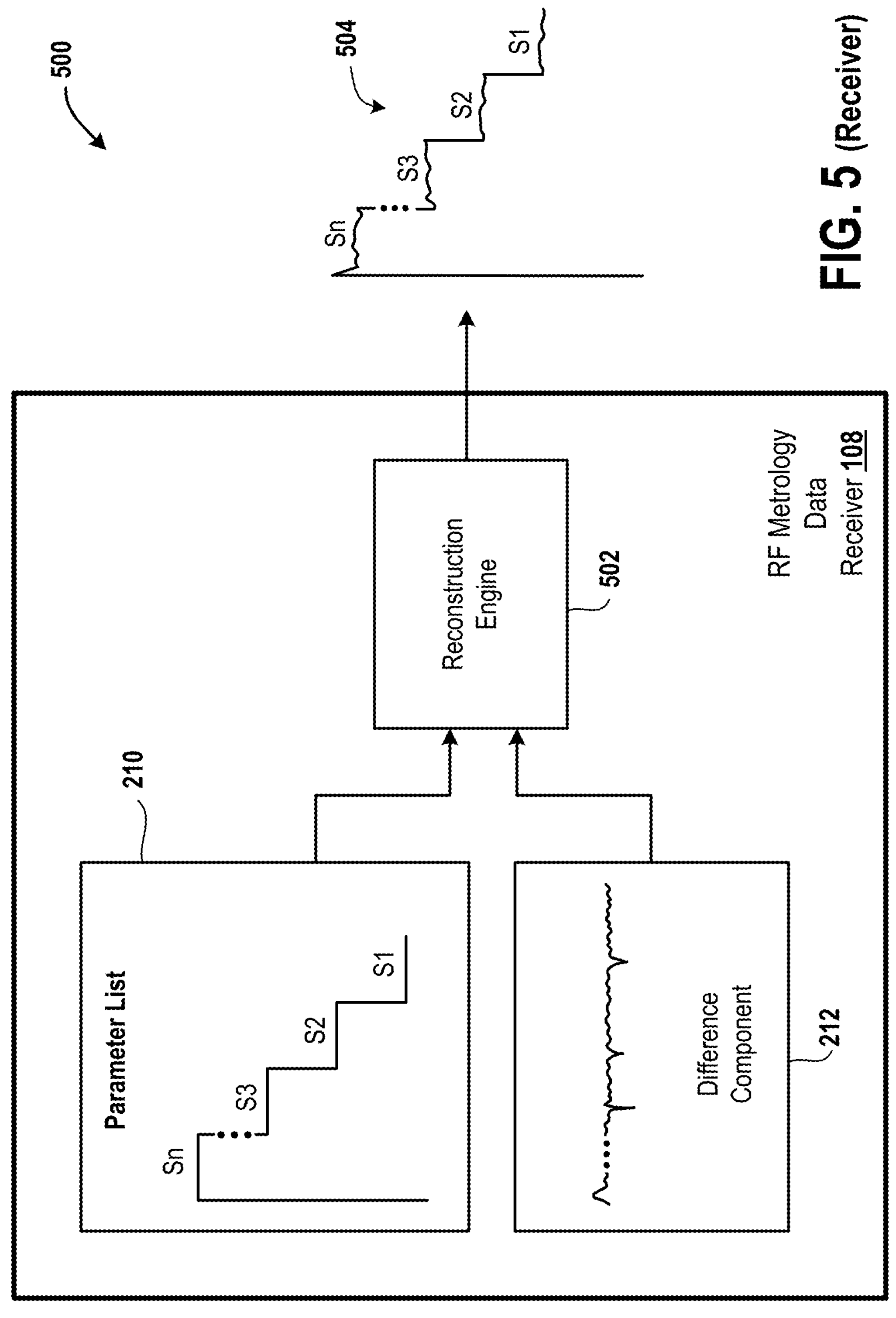
FIG. 5 (Receiver)

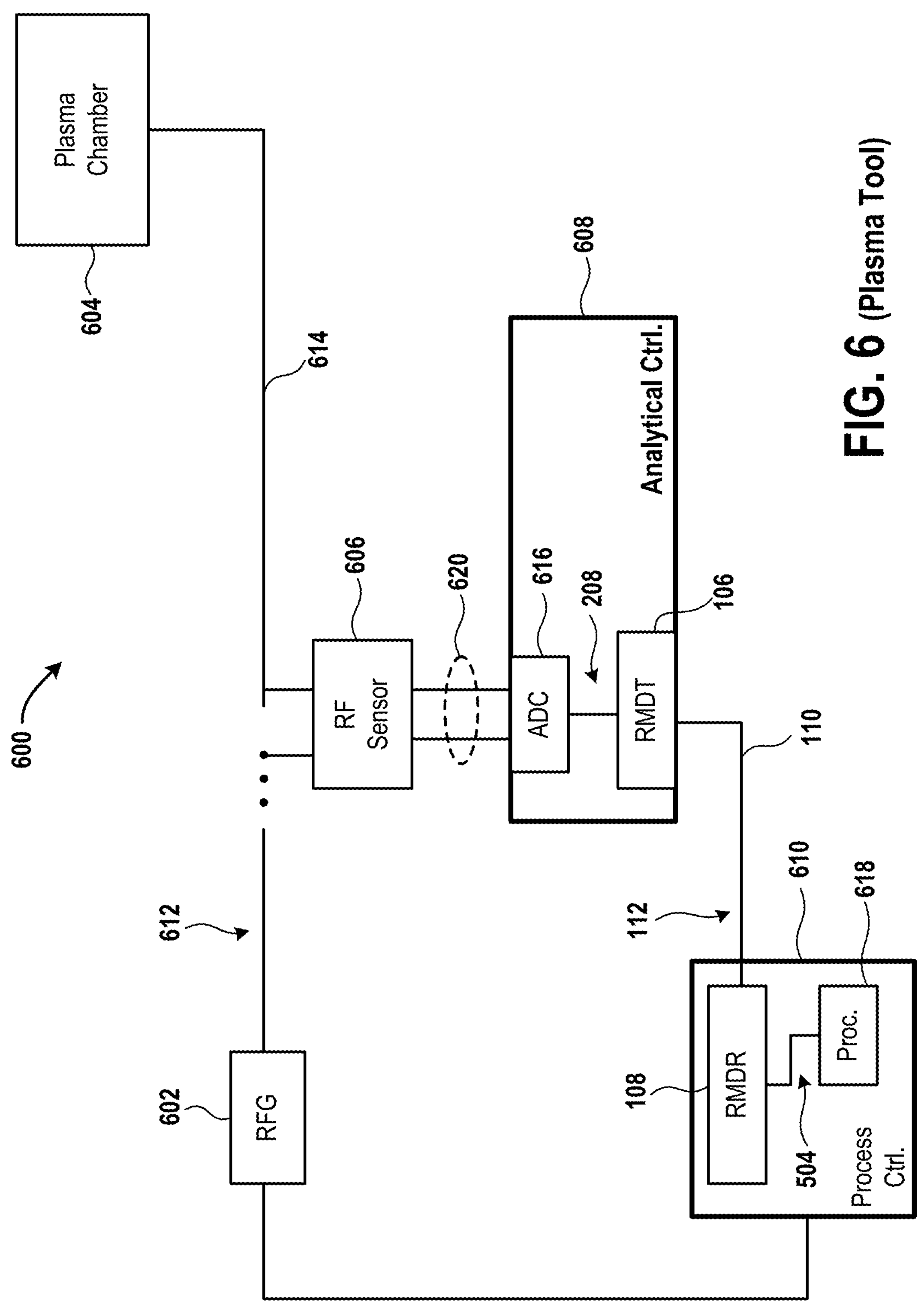
FIG. 6 (Plasma Tool)

SYSTEMS AND METHODS FOR COMPRESSING A SENSOR-BASED SIGNAL

CLAIM OF PRIORITY

This application is a national stage filing of and claims priority, under 35 U.S.C. § 371, to PCT/US23/22789, filed on May 18, 2023 and titled "SYSTEMS AND METHODS FOR COMPRESSING A SENSOR-BASED SIGNAL", which claims the benefit of and priority, under 35 U.S.C. § 119(e), to U.S. Provisional Patent Application No. 63/350,331, filed on Jun. 8, 2022, and titled "SYSTEMS AND METHODS FOR COMPRESSING A SENSOR-BASED SIGNAL", all of which are incorporated by reference herein in their entirety.

FIELD

The present embodiments relate to systems and methods for compressing a sensor-based signal.

BACKGROUND

In a plasma tool, a host computer controls one or more components of the plasma tool. One of the components is a plasma chamber. In the plasma chamber, a semiconductor wafer is placed to be processed by plasma. During the processing of the semiconductor wafer, feedback is provided from the plasma tool to the host computer. However, the feedback is not provided in an efficient manner, and therefore, it is difficult to process the semiconductor wafer according to a desired recipe.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments of the disclosure provide systems, apparatus, methods and computer programs for compressing a sensor-based signal. It should be appreciated that the present embodiments can be implemented in numerous ways, e.g., a process, an apparatus, a system, a device, or a method on a computer readable medium. Several embodiments are described below.

In an embodiment, a radio frequency (RF) plasma process used in semiconductor manufacturing can be more precisely or intelligently controlled and analyzed, if sensor information transmitted from component RF subsystems to a process controller is sent at a higher rate of information transfer. However, sending digital signal streams with more bits of precision per sample and/or with higher sample rates using some approaches leads to higher bit rates in digital data transmission. For example, a greater number of bits/second and/or more packets/second are transferred on an Ethernet link from one of the component RF subsystems to the process controller. This leads to higher processing and data rates on transmitters of the component RF subsystems and a receiver of the process controller. These higher processing and data rates are undesirable because performance aspects are limited in any given system, and thus result in costly upgrades to faster or larger or more expensive electronics or might be infeasible with practical embodiments altogether.

In an embodiment, a method of compressing and communicating data between RF plasma process subsystems, such as the component RF subsystems, and controllers, such as the process controller, is provided. The method is utilized to achieve a desirable effect of streaming higher information rates while limiting a resulting increase in digital interface data rates. The method of compressing and communication data is applicable to a class of signals found in the RF plasma process subsystems of RF plasma processing equipment. Examples of the class of signals include RF power, RF frequency, and RF phase. Examples of the RF power include forward power, reflected power, and delivered power. The method of compressing and communicating data is achieved using a codec, such as an encoder or a decoder.

In one embodiment, a method for compressing a sensor-based signal is described. The method includes receiving the sensor-based signal and dividing the sensor-based signal into a plurality of portions. Each of the plurality of portions is generated according to a corresponding cycle of a clock signal. The method further includes identifying a plurality of states of each of the plurality of portions of the sensor-based signal and dividing sensor state data for one of the plurality of states into a parameter list and a difference component. The parameter list includes a value common to all of the sensor state data for the one of the plurality of states, and the difference component includes a plurality of values that are offsets from the common value. The method includes packetizing the parameter list within a header of a packet and the difference component within a payload of the packet to compress the sensor state data.

In an embodiment, an encoder for compressing a sensor-based signal is described. The encoder includes a processor that receives the sensor-based signal. The processor divides the sensor-based signal into a plurality of portions. Each of the plurality of portions is generated according to a corresponding cycle of a clock signal. The processor further identifies a plurality of states of each of the plurality of portions of the sensor-based signal and divides sensor state data for one of the plurality of states into a parameter list and a difference component. The parameter list includes a value common to all of the sensor state data for the one of the plurality of states, and the difference component includes a plurality of values that are offsets from the common value. The processor packetizes the parameter list within a header of a packet and the difference component within a payload of the packet to compress the sensor state data. The encoder further includes a memory device coupled to the processor.

In one embodiment, a plasma system for compressing a sensor-based signal is described. The plasma system includes an RF generator that generates an RF signal. The plasma system further includes a plasma chamber coupled to the RF generator via an RF communication medium. The plasma system includes an encoder. The encoder receives the sensor-based signal including measurement information from an RF sensor coupled to the RF communication medium. The encoder divides the sensor-based signal into a plurality of portions. Each of the plurality of portions is generated according to a corresponding cycle of a clock signal. The encoder identifies a plurality of states of each of the plurality of portions of the sensor-based signal. The encoder divides sensor state data for one of the plurality of states into a parameter list and a difference component. The parameter list includes a value common to all of the sensor state data for the one of the plurality of states. The difference component includes a plurality of values that are offsets from the common value. The encoder packetizes the parameter list within a header of a packet and the difference component within a payload of the packet to compress the sensor state data.

Several advantages of the herein described systems and methods for compressing the sensor-based signal include using a lower number of units, such as bits or bytes, to represent the same amount of information. For example, in a packet that is compressed using the method for compressing the sensor-based signal, for each state and each parameter, a statistical value, such as a mean value or a median value, is provided in a header of the packet and differences from the statistical value are provided as payload. In the example, the statistical value does not repeat in the packet. As another example, in a packet that is compressed using the method for compressing the sensor-based signal, for each state and each parameter, a range between a minimum value and a maximum value is provided in a header of the packet and locations of multiple values of the parameter within the range is provided in a payload of the packet. In the example, the minimum and maximum values do not repeat in the packet. As such, efficiency in transferring data from an RF system to a processor increases. The increase in efficiency facilitates a greater control of the RF system by the processor to achieve precise processing of a substrate.

Additional advantages of the herein described systems and methods for compressing the sensor-based signal include generating a parameter list and a difference component having a dynamic range that is less than a dynamic range of a sensor-based signal. For example, the parameter list and the difference component have a lower number of bits to represent each sample of the sensor-based signal than a number of bits of the sensor-based signal. In addition, a trade-off is achieved between a number of bits used in the parameter list and the difference component to represent each sample of the sensor-based signal and digitization error. The digitization error is an error between a sensor-based signal that is reconstructed from a compressed signal and the sensor-based signal from which the compressed signal is encoded. This trade-off is achieved by splitting the sensor-based signal into the parameter list and the difference component. The digitization error is minimal and the compression provides a large amount of benefit in increasing a speed of transfer of data between an RF transmitter and an RF receiver.

Other aspects will become apparent from the following detailed description, taken in conjunction with the accompanying drawings.

BRIEF DESCRIPTION OF THE DRA WINGS

The embodiments may best be understood by reference to the following description taken in conjunction with the accompanying drawings.

FIG. 4 is a diagram of an embodiment of a packet that is generated by an encoder of the RMDT of FIG. 2 by compressing the sensor-based signal.

FIG. 5 is a diagram of an embodiment of a system to illustrate a reconstruction of a parameter list and a difference component to generate a sensor-based signal.

FIG. 6 is a block diagram of an embodiment of a plasma system having the RMDT of FIG. 2.

DETAILED DESCRIPTION

The following embodiments describe systems and methods for compressing a sensor-based signal. It will be apparent that the present embodiments may be practiced without some or all of these specific details. In other instances, well known operations have not been described in detail in order not to unnecessarily obscure the present embodiments.

Figure 1:
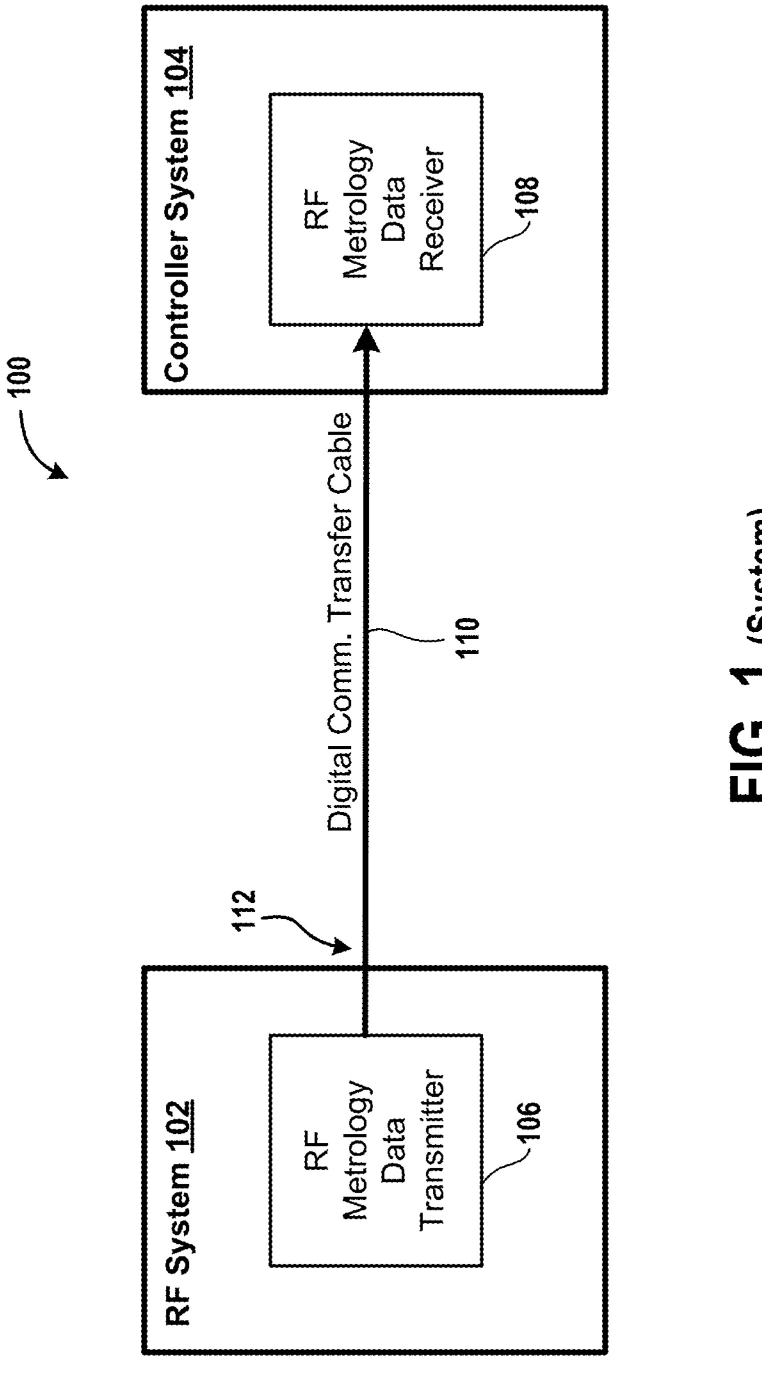
FIG. 1 is a diagram of an embodiment of a system to illustrate an environment in which a method for compressing a sensor-based signal is applied.

FIG. 1 is a diagram of an embodiment of a system 100 to illustrate an environment in which the method for compressing a sensor-based signal is applied. The system 100 includes a radio frequency (RF) system 102 and a controller system 104. An example of the RF system 102 includes a system having an RF generator, an RF sensor, and an analytical controller. In the example, the RF generator is coupled to the RF sensor, which is coupled to the analytical controller. Further, in the example, the analytical controller includes an analog-to-digital converter (ADC) and a communication device. In the example, the ADC is coupled to the communication device. Examples of an RF sensor include a power sensor and a voltage and current probe. An example of a communication device is a device that applies an Ethernet User Datagram Protocol™ (UDP), an Ethernet for Control Automation Technology™ (EtherCAT) protocol, a Universal Serial Bus™ (USB) protocol, a FireWire™ protocol, and a 10BASE-F™ protocol.

An example of the controller system 104 includes an RF analysis control system with one or more processors and one or more communication devices. To illustrate, the controller system 104 is a host computer, such as a desktop, a laptop, a smartphone, or a tablet. To further illustrate, the controller system 104 includes one or more controllers, such as a process controller or a process analyzer.

The RF system 102 includes an RF metrology data transmitter (RMDT) 106 and the controller system 104 includes an RF metrology data receiver (RMDR) 108. The RMDT 106 is located within a communication device of the RF system 102 and the RMDR 108 is located within a communication device of the controller system 104. As an example, the RDMT 106 includes one or more controllers. To illustrate, a controller is an application specific integrated circuit (ASIC) or a programmable logic device (PLD) or a combination of a processor and a memory device. The processor of the controller is coupled to the memory device of the controller. Also, as an example, the RMDR 108 includes one or more controllers.

The RMDT 106 is coupled to the RMDR 108 via a transfer cable 110, such as a digital communication transfer cable. Examples of the transfer cable 110 include an electrical cable and a fiber-optic cable.

The RMDT 106 receives sensor-based signals, such as digital sensor signals, from the ADC coupled to the RF sensor and applies the method for compressing the sensor-based signals to output a compressed signal 112. As an example, each sensor-based signal includes measurement information associated with an RF signal. An example of the measurement information includes forward power of the RF signal, reflected power of the RF signal, phase between the forward and reverse powers, and frequency of the RF signal. Another example of the measurement information includes voltage of the RF signal, current of the RF signal, phase between the voltage and current, and frequency of the RF signal. The method for compressing the sensor-based signal is applied to encode or compress the sensor-based signal.

The RMDT 106 sends the compressed signal 112 via the transfer cable 110 to the RMDR 108. Upon receiving the compressed signal 112, the RMDR 108 decompresses or decodes the compressed signal 112 to output decompressed digital signals. The measured information within the decompressed digital signals is analyzed by the one or more processors of the controller system 104 to control components of a plasma system. Examples of the components include the RF generator, a match, and a plasma chamber.

Figure 2:
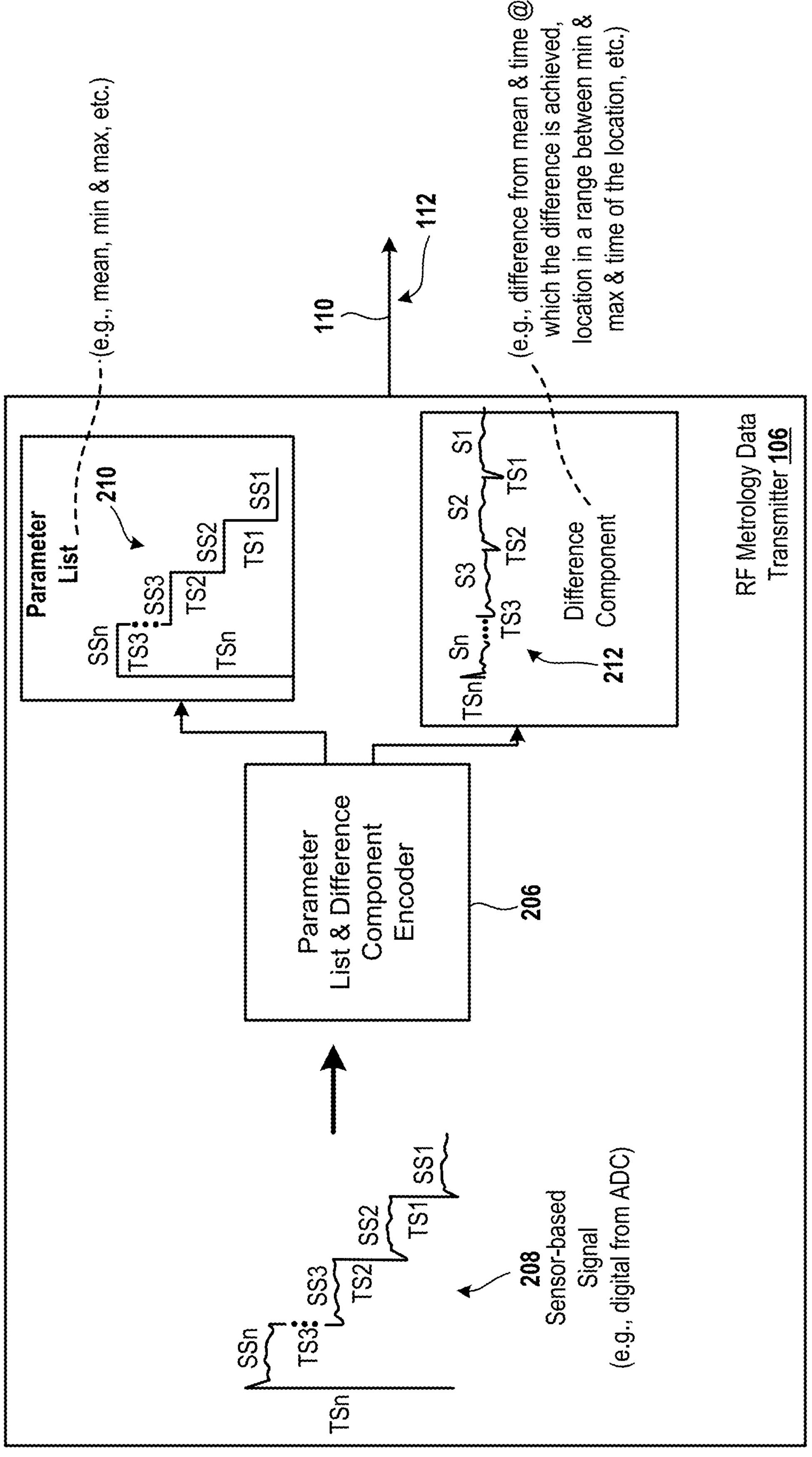
FIG. 2 is a diagram of an embodiment of a radio frequency (RF) metrology data transmitter (RMDT) to illustrate generation of a parameter list and a difference component to facilitate encoding or compression of the sensor-based signal.

FIG. 2 is a diagram of an embodiment of the RMDT 106 to illustrate generation of a parameter list 210 and a difference component 212 from sensor-based signals, such as a sensor-based signal 208. The generation of the parameter list 210 and the difference component 210 is done to facilitate encoding, such as compression, of the sensor-based signals. The RMDT 106 includes an encoder 206, such as a parameter list and difference component encoder. An example of the encoder 206 is a compressor. To illustrate, the encoder 206 is an ASIC or a PLD or a controller. The encoder 206 is coupled to the ADC (not shown), which is coupled to the RF sensor of the RF system 102 (FIG. 1). The RF sensor of the RF system 102 outputs analog measurement signals, which include the measured information. The ADC converts the analog measurement signals into the sensor-based signals. For example, a first one of the sensor-based signals is a digital signal that represents forward power of the RF signal, a second one of the sensor-based signals is a digital signal that represents reverse power of the RF signal, a third one of the sensor-based signals is a digital signal that represents a phase between the forward power and the reverse power, and a fourth one of the sensor-based signals is a frequency of the RF signal. As another example, a first one of the sensor-based signals is a digital signal that represents voltage of the RF signal, a second one of the sensor-based signals is a digital signal that represents current of the RF signal, a third one of the sensor-based signals is a digital signal that represents a phase between the voltage and the current, and a fourth one of the sensor-based signals is a frequency of the RF signal.

The encoder 206 receives the sensor-based signals from the ADC and identifies that each of the sensor-based signals, such as the sensor-based signal 208, has multiple cycles and multiple states. For example, the encoder 206 determines that the sensor-based signal 208 repeats periodically at each cycle of a clock signal. To illustrate, the clock signal is generated by the controller system 104 (FIG. 1) and send to the RF system 102. In the illustration, the clock signal is a digital pulsed signal having two different logic levels, such as a logic level 1 and a logic level 0, during each cycle of the clock signal. In the example, the encoder 206 identifies that a parameter of the sensor-based signal 208 is within a predetermined range during a first time window, outside the predetermined range during a second time window, and is back again within the predetermined range during a third time window. In the example, the first time window precedes the second time window, and the second time window precedes the third time window. In the example, upon identifying the parameter of the sensor-based signal 208 is within the predetermined range during the third time window, the encoder 206 determines that a portion of the sensor-based signal 208 that occurs within the first and second time windows repeats at a beginning of the third time window. In the example, the encoder 206 divides the sensor-based signal 208 into multiple portions, and each portion coincides with a single corresponding cycle of the clock signal. To illustrate, each portion of the sensor-based signal 208 spans across, such as extends across, a corresponding cycle of the clock signal. In the illustration, a first portion of the sensor-based signal 208 spans across a first cycle of the clock signal and a second portion of the sensor-based signal 208 spans across a second cycle of the clock signal. In the illustration, the second cycle is consecutive to the first cycle. In the illustration, the second portion is a repetition of all states of the parameter of the first portion.

Further, in the example, the encoder 206 identifies that the sensor-based signal 208 includes a transition state TSn, a steady state SSn, a transition state TS3, a steady state SS3, a transition state TS2, a steady state SS2, a transition state TS2, and a steady state SS1, where n is a positive integer. In the example, the encoder 206 determines that the transition state TSn precedes the steady state SSn, the steady state SSn precedes the transition state TS3, the transition state TS3 precedes the steady state SS2, the steady state SS2 precedes the transition state TS1, and the transition state TS1 precedes the steady state SS1. To illustrate, the encoder 206 identifies that a steady state includes power values and a transition state includes power values. In the illustration, the encoder 206 determines that the power values of the steady-state lie within a first predetermined range to form a power level. Further in the illustration, the encoder 206 determines that power values of the transition state represent a transition between two steady states. In the illustration, the encoder 206 determines that the power values of the transition state lie outside a second predetermined range of power values of a preceding steady state that precedes the steady-state. Also, in the illustration, the encoder 206 determines that the power values of the transition state lie outside the first predetermined range. Either a transition state or a steady state is sometimes referred to as a state, such as a signal state.

An example of the parameter includes forward power, or reverse power, or phase between the forward and reverse power, or frequency of the RF signal. Another example of the parameter includes voltage, or current, or phase between the voltage and current, or frequency of the RF signal. Yet another example of the parameter includes delivered power, which is a difference between the forward power and the reverse power.

Upon identifying each state of each of the sensor-based signals, the encoder 206 divides, such as separates, sensor state data, such as the parameter, of each state of each of the sensor-based signals into the parameter list 210 and the difference component 212 to facilitate compression, such as encoding, of the sensor-based signals. For example, the encoder 206 identifies each power value of a state of the sensor-based signal 208 and calculates a statistical value, such as a mean or a median, from the power values of the state. In the example, the statistical value is of the state and is an example of a value that is common to the sensor state data for the state. Further, in the example, the parameter list 210 includes the statistical values of the steady states and the transition states of the sensor-based signal 208. To illustrate, the parameter list 210 includes eight statistical values for the four steady states Sn through S1 and the transition states TSn through TS1, where n is four. To further illustrate, the parameter list 210 includes a first statistical value determined from the power values of the transition state TSn, a second statistical value determined from the power states of the steady state SSn, a third statistical value determined from the power values of the transition state TS3, a fourth statistical value determined from the power values of the steady state SS3, and so on until an eighth statistical value is determined from the power values of the steady state SS1.

Further, in the example, the encoder 206 determines a difference value between the statistical value for each state of the sensor-based signal and a power value of the state to generate the difference component 212 for all the states of the sensor-based signal 208. To illustrate, the encoder 206 computes a first difference value between the first statistical value and a first value of the transition state TSn, a second difference value between the first statistical value and a second value of the transition state TSn, and so on until a $p^{th}$ difference value between the first statistical value and a $p^{th}$ value of the transition state TSn is computed, where p is a positive integer. In the illustration, each of the first through $p^{th}$ difference values is an illustration of an offset from the first statistical value. Further, in the illustration, the encoder 206 computes a primary difference value between the second statistical value and a primary value of the steady state SSn, a secondary difference value between the second statistical value and a secondary value of the steady state SSn, and so on until a $u^{th}$ difference value between the second statistical value and an $u^{th}$ value of the steady state SSn is calculated, where u is a positive integer. In the illustration, each of the primary through $u^{th}$ difference values is an example of an offset from the second statistical value. In the illustration, the first through $p^{th}$ difference values and the primary through $u^{th}$ difference values are examples of the difference component 212. Further, in the illustration, either u is equal to or unequal to p. Continuing with the illustration, the encoder 206 accesses a predetermined value of p and a predetermined value of u from the memory device of the encoder 206. To further illustrate, the predetermined value p and the predetermined value u are received from a user via an input device, such as a combination of a mouse and a keyboard, that is coupled to the encoder 206.

Moreover, in the example, the encoder 206 identifies a time location, such as a time window or a time period, within the state, at which each of the first through $p^{th}$ difference values of the transition state TSn and each of the primary through $u^{th}$ difference values of the steady state SSn state occur. To illustrate, the encoder 206 identifies that the first value occurs during a time window $TW1_{TS}$ within the transition state TSn to determine that the first difference value occurs at a time location of the time window $TW1_{TS}$ within the transition state TSn. To further illustrate, the first value occurs during the time window $TW1_{TS}$ when the first value is output from the ADC during the time window $TW1_{TS}$. As another further illustration, the first value occurs during the time window $TW1_{TS}$ when the ADC receives the first value from the RF sensor of the RF system 102 (FIG. 1). As another illustration, the encoder 206 identifies that the primary value occurs during a time window $TW1_{SS}$ within the transition state SSn to determine that the primary difference value occurs at a time location of the time window $TW1_{SS}$ within the steady state SSn. To further illustrate, the primary value occurs during the time window $TW1_{SS}$ when the primary value is output from the ADC during the time window $TW1_{SS}$. As another further illustration, the primary value occurs during the time window $TW1_{SS}$ when the ADC receives the primary value from the RF sensor of the RF system 102. In the example, the time locations of the first through $p^{th}$ difference values of the transition state TSn and of the primary through $u^{th}$ difference values of the steady state SSn are illustrations of the difference component 212.

As another example, the encoder 206 determines a maximum value and a minimum value for each state of the sensor-based signal 208 to determine the parameter list 210, and the minimum or the maximum value of the state is an example of a value that is common to the sensor state data of the state. To illustrate, the encoder 206 determines a minimum of all values of a signal state SISn, such as the transition state TSn or the steady state SSn, of the sensor-based signal 208 to determine the minimum value of the signal state SISn. Further, in the illustration, the encoder 206 determines a maximum of all values of the signal state SISn of the sensor-based signal 208 to determine the maximum value of the signal state SISn. In the illustration, the minimum and maximum values are examples of the parameter list 210.

Further, in the example, the encoder 206 determines a location of a value of the sensor-based signal 208 within a range between the minimum and maximum values of the signal state SISn, and further determines a time location, such as a time window or a time period, at which the location occurs to determine the difference component 212. To illustrate, the encoder 206 determines that a first value of the signal state SISn of the sensor-based signal 208 is less than the maximum value of the signal state SISn by a first amount or is greater than the minimum value of the signal state SISn by a second amount. In the illustration, either the first amount or the second amount or a combination thereof is an example of the location of the first value. Also, in the illustration, the location of the first value is an example of the difference component 212. Moreover, in the illustration, the encoder 206 determines a time location at which the first value occurs within the signal state SISn. To further illustrate, the encoder 206 determines that the first value is output from the ADC at the time location. As another further illustration, the encoder 206 determines that the first value is received by the ADC from the RF sensor of the RF system 102 at a time location, such as during a time window or a time period, to determine the time location. In the example, the time location of occurrence of the value of the sensor-based signal 208 and the location of the value of the sensor-based signal 208 within the range between the minimum and maximum values of the signal state SISn are illustrations of the difference component 212.

Figure 3:
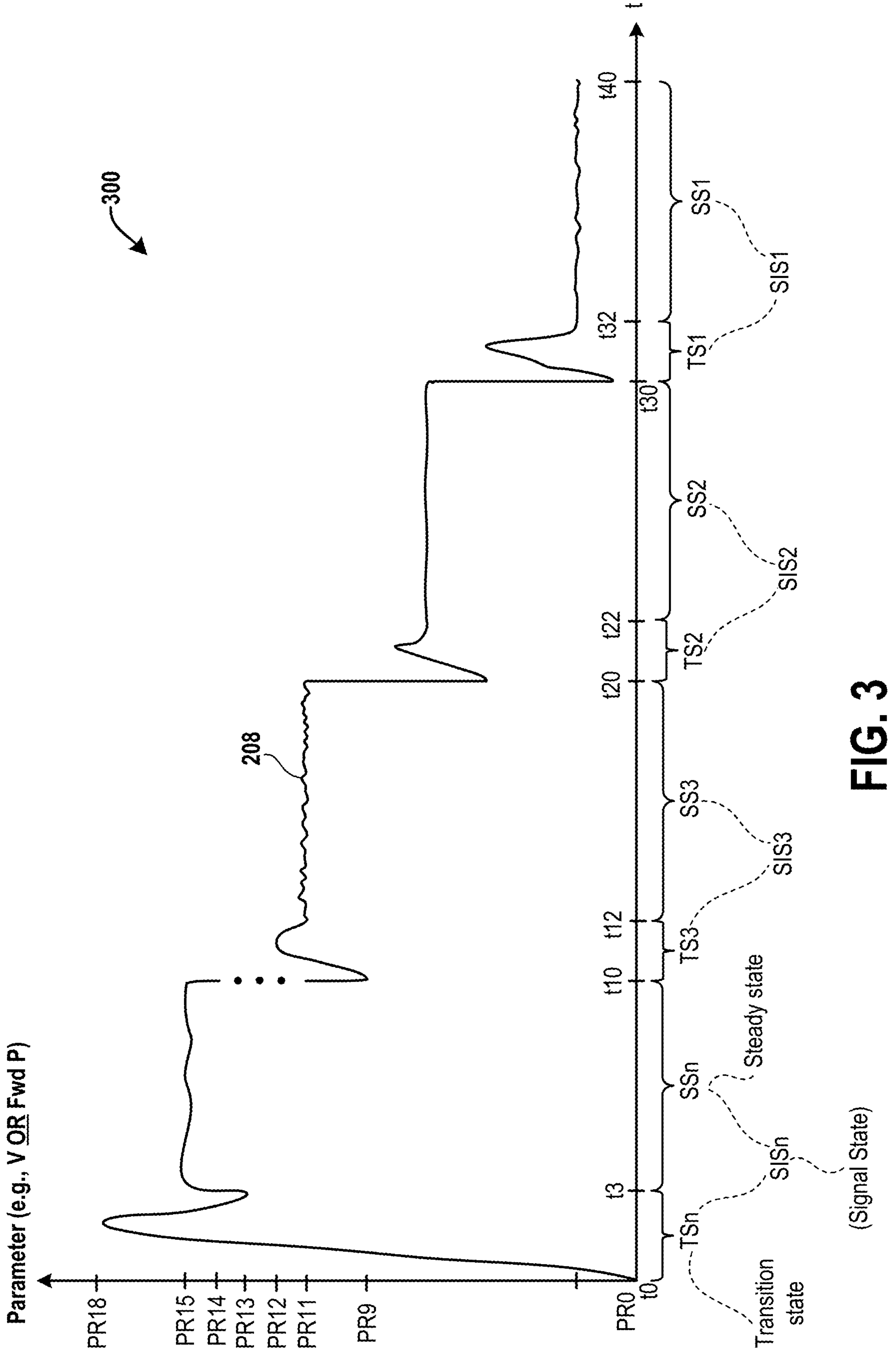
FIG. 3 is a diagram of an embodiment of a graph to illustrate a transition state or a steady state of a parameter of an RF signal versus time.

FIG. 3 is a diagram of an embodiment of a graph 300 to illustrate a transition state or a steady state of the parameter of the RF signal versus time t. The parameter of the RF signal is represented as the parameter of the sensor-based signal 208. The graph 300 plots the parameter on a y-axis and the time t on an x-axis. The time t progresses from a time t0 to a time t40. Also, the parameter increases from a parameter value PR0 to a parameter value PR18.

During a time period from the time to t0 the time t3, the parameter transitions from the parameter value PR0 to the parameter value PR18. The time period between the times to and t3 is a time period of the transition state TSn. During the transition state TSn, the parameter values of the sensor-based signal 208 increase from PR0 to PR18, then decrease from PR18 to PR13, and then increase from PR13 to PR15. Moreover, during a time period from the time t3 to the time t10, the parameter is substantially constant or constant, and the time period is of the steady state SSn. For example, during the steady state SSn, the parameter has the parameter value PR15. As another example, during the steady state SSn, the parameter has multiple parameter values that lie within a predetermined range from a mean or a median of the parameter values. In the example, the mean or median is PR15.

Furthermore, during a time period from the time t10 to the time t12, the parameter transitions from the parameter value PR15 to the parameter value PR11. The time period between the times t10 and t12 is a time period of the transition state TS3. During the transition state TS3, the parameter values of the sensor-based signal 208 decrease from PR15 to PR9, then increase from PR9 to PR12, and then decrease from PR12 to PR11. Also, the parameter values of the transition state TS3 lie outside a first predetermined range of the parameter values of the steady state SSn and a second predetermined range of the parameter values of the steady state SS3. Moreover, during a time period from the time t12 to the time t20, the parameter is substantially constant or constant, and the time period is of the steady state SS3. For example, during the steady state SS3, the parameter has the parameter value PR11. As another example, during the steady state SS3, the parameter has multiple parameter values that lie within a predetermined range from a mean or a median of the parameter values. In the example, the mean or median is PR11.

Similarly, during a time period from the time t20 to the time t22, a transition state TS2 of the sensor-based signal 208 occurs and during a time period from the time t22 to the time t30, a steady state SS2 of the sensor-based signal 208 occurs. Also, during a time period from the time t30 to the time t32, a transition state TS1 of the sensor-based signal 208 occurs and during a time period from the time t32 to the time t40, a steady state SS1 of the sensor-based signal 208 occurs. It should be noted that the transition states TS1 through TSn and the steady states SS1 through SSn repeat at each cycle of the clock signal.

FIG. 4 is a diagram of an embodiment of a packet 400, such as a UDP packet, that is generated by the encoder 206 (FIG. 2). The encoder 206 packetizes, within the packet 400, the parameter list 210 and the difference component 212 to compress the sensor-based signals, such as the sensor-based signal 208 and an additional sensor-based signal. As an example, the sensor-based signal 208 represents forward power of the RF signal and the additional sensor-based signal represents reverse power of the RF signal. Further, in the example, the additional sensor-based signal is output from the ADC simultaneously with the sensor-based signal 208. In the example, the additional sensor-based signal has the state S1 through Sn. As another example, the sensor-based signal 208 represents voltage of the RF signal and the additional sensor-based signal represents current of the RF signal. In the example, the additional sensor-based signal has the state S1 through Sn. Also, in the example, the additional sensor-based signal is output from the ADC simultaneously with the sensor-based signal 208

The packet 400 includes a header 402 and a payload 404. The header 402 is situated in front of the payload 404. For example, the header 402 is sent from the encoder 206 to the RMDR 108 (FIG. 1) before the payload 404 is sent. The payload 404 includes multiple blocks 0 through N, where N is a positive integer. Generation of packets, such as the packet 400, by the encoder 206 from the parameter list 210 and the difference component 212 (FIG. 2) is an example of packetizing by the encoder 206.

The encoder 206 generates the header 402 from the parameter list 210 and generates the payload 404 from the difference component 212. For example, the encoder 206 includes, such as integrate or embeds, within the header 402, a mode vector for each state of the parameter of the sensor-based signal 208. To illustrate, the mode vector identifies each state, such as the transition state TSn through a transition state TS(n−q) and the steady state SSn through a steady state SS(n−q), of the parameter of the sensor-based signal 208 for which the difference component 212 is included within the payload 404, where q is an integer less than n. To further illustrate, the transition state TSn is assigned a first set of units, such as bits or bytes, in the mode vector to identify the transition state TSn and the transition state TS(n−q) is assigned a second set of units, such as bits or bytes, in the mode vector to identify the transition state TS(n−q). Moreover, in the further illustration, the steady state SSn is assigned a third set of units, such as bits or bytes, in the mode vector to identify the steady state SSn and the steady state SS(n−q) is assigned a fourth set of units, such as bits or bytes, in the mode vector to identify the steady state SS(n−q). In the further illustration, at least one unit of any of the first through fourth sets is different from at least one unit of any of the remaining of the first through fourth sets to distinguish the at least one unit of any of the first through fourth sets from the at least one unit of any of the remaining of the first through fourth sets.

Further, in the example, the encoder 206 includes, within the header 402A, a control setpoint for each state of the parameter the sensor-based signal 208. To illustrate, the control setpoint for each of the signal states SIS(n−q) through SISn is received by the RF system 102 from the controller system 104 (FIG. 1), and is sent back from the RF system 102 to the controller system 104 as a confirmation of the control setpoint. In the illustration, an example of the control setpoint is a forward power value or voltage for each state of the RF signal. Further, in the illustration, the parameter of the RF signal has the same number of states as that of the parameter of the sensor-based signal 208.

Also, in the example, the encoder 206 includes, within the header 402A, a state width, such as a time period or a time window or a time interval or a duty cycle, of each state of the parameter of the sensor-based signal 208. To illustrate, the encoder 206 assigns a set of units to a state width of the parameter of the signal state SISn and assigns a set of units to a state width of the parameter of the signal state SIS(n−q). In the example, the state widths are of the states identified by the mode vector to be in the packet 400.

Continuing with the example, the encoder 206 includes, within the header 402, the statistical value or the minimum and maximum values of each state of the parameter of the sensor-based signal 208. To illustrate, the encoder 206 integrates, within the header 402, one set of units identifying the statistical value of the signal state SISn of the parameter and another set of units identifying the statistical value of the signal state SIS(n−q) of the parameter. As another illustration, the encoder 206 integrates, within the header 402, one set of units identifying a boundary value, such as the maximum value or the minimum value, of the signal state SISn of the parameter. To further illustrate, the encoder 206 embeds, within the header 402, one set of units identifying the maximum value of the signal state SISn of the parameter and another set of units identifying the minimum value of the signal state SISn.

Also in the example, the encoder 206 embeds, within the payload 404, one or more difference values, or one or more locations within a range from maximum and minimum values, of each state of the parameter of the sensor-based signal 208. To illustrate, the encoder 206 includes, within one or more of the blocks 1 through N of the payload 404, one or more difference values of the signal state SISn of the parameter of the sensor-based signal 208. In the illustration, the one or more difference values of the signal state SISn of the parameter are differences, such as distances, from the statistical value of the signal state SISn of the parameter, and the statistical value is embedded within the header 402. In the illustration, each difference value is a set of units. As another illustration, the encoder 206 includes, within one or more of the blocks 1 through N of the payload 404, one or more locations of one or more values within a range between the maximum and minimum values of the signal state SIS of the parameter of the sensor-based signal 208. In the other illustration, the maximum and minimum values of the signal state SISn are integrated in the header 402. To further illustrate, the encoder 206 embeds, within one or more of the blocks 1 through N, a first location of a first value within the range of the signal state SIS of the parameter and a second location of a second value within the range of the signal state SIS. In the further illustration, the first location is a distance, such as an offset, of the first value from the minimum or maximum value of the signal state SIS. Also, in the further illustration, the second location is a distance, such as an offset, of the second value from the minimum or maximum value of the signal state SIS. In the further illustration, the encoder 206 assigns a first set of units to the first location and a second set of units to the second location. In the further illustration, at least one unit of the first set of units is different from, such as unequal to, at least one unit of the second set.

Further, in the example, the encoder 206, integrates within the one or more blocks 1 through N of the payload 404, a mode timer, such as an edge timer. To illustrate, the encoder 206, includes within one or more of the blocks 1 through N, a time of occurrence, such as the time location, of each difference value from the statistical value of the signal state SISn of the parameter. In the illustration, a time of occurrence of each difference value is assigned a set of units. To further illustrate, a time of occurrence of a difference value of the signal state SISn is assigned a set of units and a time of occurrence of another difference value of the signal state SISn is assigned another set of units. At least one unit of the set assigned to the difference value is different from, such as unequal to, at least one unit of the other set assigned to the other difference value. As another illustration, the encoder 206, includes within one or more of the blocks 1 through N, a time of occurrence, such as the time location, of each location within the range between maximum and minimum values of the signal state SISn of the parameter. To further illustrate, the encoder 206 assigns a set of units to a time of occurrence of a location within the range between maximum and minimum values of the signal state SISn and another set of units to another time of occurrence of another location within the range of the signal state SISn. In the further illustration, at least one unit of the set assigned to the time of occurrence of the location within the range is different from, such as greater to or less, than at least one unit of the set assigned to the other time of occurrence of the other location within the range.

In the same manner as that applied to the sensor-based signal 208 to generate the compressed signal 112, the encoder 206 receives additional sensor state data of the additional sensor-based signal (not shown), similar to the sensor-based signal 208, from the ADC and compresses the additional sensor-based signal to generate the header 402 and the payload 404 for each state of the additional sensor-based signal. The additional sensor-based signal is compressed to generate the compressed signal 112. For example, the sensor-based signal 208 represents forward power of the RF signal and the additional sensor-based signal represents reverse power of the RF signal. In the example, the encoder 206 or another processor of the RF system 102 determines a phase between the forward and reverse powers from the forward and reverse powers. Also, in the example, the encoder 206 or the other processor determines a frequency of the forward power. As another example, the sensor-based signal represents voltage of the RF signal and the additional sensor-based signal represent current of the RF signal. In the example, the encoder 206 or another processor of the RF system 102 determines a phase between the voltage and current from the voltage and current. Also, in the example, the encoder 206 or the other processor determines a frequency of the voltage or current. Examples of the additional sensor state data include values of the parameter of the additional sensor-based signal.

The encoder 206 generates multiple packets, such as the packet 400, and sends, such as streams, the packets as the compressed signal 112 (FIG. 1) via the transfer cable 110 to the RMDR 108 (FIG. 1). For example, each packet generated by the encoder 206 has a maximum length in units, such as 1500 bytes. Also, in the example, the packets are streamed from the encoder 206 at a predetermined fixed rate. Moreover, in the example, each of the packets has a header, such as the header 402 of a fixed predetermined size. Also, in the example, each of the blocks in a packet is of a fixed predetermined size. Moreover, in the example, a number of blocks in one of the packets is different from or equal to a number of blocks in one of remaining ones of the packets.

In an embodiment, it should be noted that the encoder 206 sends a request to the ADC to obtain a time location from the ADC. For example, the time location is a time window of receipt of a value of the parameter of the sensor-based signal 208 from the sensor of the RF system 102 by the ADC or a time window during which the value of the parameter of the sensor-based signal 208 is output from the ADC to the encoder 206. In the embodiment, in response to the request, the ADC provides the time location to the encoder 206.

In one embodiment, the sensor-based signal 208 is a three-state signal having three steady states or a two-state signal having two steady states.

In an embodiment, the functions, described herein, as being performed by the encoder 206 are performed by the processor of the encoder 206.

FIG. 5 is this a diagram of an embodiment of a system 500 to illustrate a reconstruction, such as decoding or decompressing, of the parameter list 210 and the difference component 212 to generate multiple sensor-based signals, such as a sensor-based signal 504 and a further sensor-based signal. As an example, the sensor-based signal 504 represents forward power of the RF signal and the further sensor-based signal represents reverse power of the RF signal. As another example, the sensor-based signal 504 represents voltage of the RF signal and the further sensor-based signal represents current of the RF signal. The system 500 includes the RMDR 108 and the sensor-based signal 504. The RMDR 108 includes a reconstruction engine 502. Examples of the reconstruction engine 502 include a decompressor and a decoder. To illustrate, the reconstruction engine 502 is an ASIC or a PLD or a controller. The reconstruction engine 502 is coupled to a processor of the RMDR 108.

The reconstruction engine 502 receives the packets including the parameter list 210 and the difference component 212 from the encoder 206, and applies the reconstruction to each of the packets to generate the sensor-based signal 504 and the further sensor-based signal. For example, the reconstruction engine 502 performs a reverse operation compared to the compression or encoding performed by the encoder 206 (FIG. 2) to generate the sensor-based signal 504 and the further sensor-based signal. In the example, the reconstruction engine 502 identifies, from the header 402 (FIG. 4), each state of the parameter of the sensor-based signal 208 (FIG. 2) and determines the state to be of the parameter of the sensor-based signal 504. Further in the example, the reconstruction engine 502 identifies, from the header 402, the state width for each state of the parameter of the sensor-based signal 208 and determines the state width to be of the parameter of the sensor-based signal 504. Also, in the example, the reconstruction engine 502 identifies, from the header 402, the statistical value or the minimum and maximum values of each state of the parameter of the sensor-based signal 208.

Moreover, in the example, the reconstruction engine 502 identifies, from the payload 404 (FIG. 4), each difference value from the statistical value or each location within the range between minimum and maximum values of each signal state of the sensor-based signal 208. Further, in the example, the reconstruction engine 502 determines, such as calculates or computes or generates, each value of each signal state of the parameter of the sensor-based signal 504 from the difference values of the signal state and the statistical value of the signal state or from the locations of values of the signal states and the range between the minimum and maximum values of the signal state. To illustrate, the reconstruction engine 502 adds each difference value to the statistical value of the signal state SISn of the parameter of the sensor-based signal 208 to determine values of the signal state SISn of the sensor-based signal 504. As another illustration, the reconstruction engine 502 subtracts a location of a value of the signal state SISn of the parameter of the sensor-based signal 208 from the maximum value of the range between the maximum and minimum values of the signal state SISn or adds the location of the value to the minimum value of the range or performs both the addition and subtraction to calculate a value of the signal state SISn of the parameter of the sensor-based signal 504. In this manner, the reconstruction engine 502 reconstructs the sensor-based signal 504 and the further sensor-based signal from the parameter list 210 and the difference component 212 received within the packets.

In an embodiment, the functions, described herein, as being performed by the reconstruction engine 502 are performed by a processor of the reconstruction engine 502.

FIG. 6 is a block diagram of an embodiment of a plasma system 600. The plasma system 600 includes an RF generator 602, a plasma chamber 604, an RF sensor 606, and analytical controller 608, and a process controller 610. The RF generator 602 is a low frequency (LF), a medium frequency (MF), or a high frequency (HF) RF generator. An example of the low frequency includes a frequency ranging from 400 kilohertz (kHz) to 3 megahertz (MHz). An example of the medium frequency includes a frequency ranging from 13 MHz to 30 MHz and an example of the high frequency includes a frequency ranging from 60 MHz to 70 MHz. Examples of the plasma chamber 604 include a capacitively coupled plasma (CCP) chamber and an inductively coupled plasma (ICP) chamber. An example of the RF sensor 606 includes a parameter sensor, such as voltage and current (VI) sensor or a power sensor. To illustrate, the RF sensor 606 measures an amplitude of a voltage of an RF signal 612 that is sent via an RF communication medium 614 from the RF generator 602 to the plasma chamber 604, an amplitude of a current of the RF signal 612, and a phase between the voltage and current amplitudes. As an example, an amplitude is a value. As another illustration, the RF sensor 606 measures an amplitude of forward power of the RF signal 612, an amplitude of reverse power of the RF signal 612, and a phase between the forward and reverse power amplitudes. To further illustrate, the forward power of the RF signal 612 is power that is supplied from the RF generator 602 via the RF communication medium 614 to the plasma chamber 604 and the reverse power of the RF signal 612 is power that is reflected from the plasma chamber 604 towards the RF generator 602 via the RF communication medium 614.

An example of the RF communication medium 614 is an RF transmission line or combination of an RF cable and an RF transmission line. To illustrate, when there is the match, such as a match network or an impedance matching circuit or an impedance matching network, between the RF generator 602 and the plasma chamber 604, the RF generator 602 is coupled to an input of the match via the RF cable and an output of the match is coupled to the plasma chamber 604 via the RF transmission line. In the illustration, the match matches an impedance of a load, such as the plasma chamber 604, coupled to the output of the match with an impedance of a source, such as the RF generator 602, coupled to the input of the match. The impedances are matched to modify an impedance of the RF signal 612 to output a modified RF signal at the output of the match, and the modified RF signal is provided to the plasma chamber 604. As another illustration, when the match does not exist between the RF generator 602 and the plasma chamber 604, the RF generator 602 is coupled to the plasma chamber 604 via an RF transmission line. In the illustration, the RF generator 602 is coupled to the plasma chamber 604 via a reactive circuit, such as a capacitor, instead of the match. In the illustration, the reactive circuit modifies an impedance of the RF signal 612 to output a changed RF signal, and the changed RF signal is provided to the plasma chamber 604.

The analytical controller 608 includes an ADC 616 and the RMDT 106. The ADC 616 is coupled to the RMDT 106. Moreover, the process controller 610 includes the RMDR 108 and a processor 618. Examples of the process controller 610 include a desktop computer, laptop computer, a smart phone, and a tablet. The processor 618 is coupled to the RMDR 108. As an example, the RF generator 602, the RF sensor 606, and the analytical controller 608 are components of the RF system 102 (FIG. 1). Also, in the example, the process controller 618 is an example of the controller system 104 (FIG. 1).

A wafer, such as a dummy wafer or a semiconductor wafer, is placed in the plasma chamber 604. The RF generator 602 generates the RF signal 612 and sends the RF signal 612 via the RF communication medium 614 to the plasma chamber 604. In addition to the RF signal 612, one or more process gases, such as a nitrogen-containing gas or an oxygen-containing gas or a combination thereof, are supplied to the plasma chamber 604. When an RF signal, such as the RF signal 612, or the modified RF signal, or the changed RF signal, is being supplied to the plasma chamber 604 with the one or more process gases, plasma is generated or stricken within the plasma chamber 604 to process the wafer. For example, materials are deposited on the wafer or the wafer is etched or the wafer is cleaned.

When the RF signal is supplied to the plasma chamber 604, the RF sensor 606 measures a parameter of the RF signal to output analog measurement signals 620 to the ADC 616. The ADC 616 converts the analog measurement signals 620 from an analog format to a digital format to output the sensor-based signal 208 and the additional sensor-based signal to the RMDT 106. The encoder 206 (FIG. 2) of the RMDT 106 compresses the sensor-based signal 208 and the additional sensor-based signal to output the compressed signal 112, and sends the compressed signal 112 via the transfer cable 110 to the RMDR 108. The reconstruction engine 502 of the RMDR 108 receives the compressed signal 112 and decodes, such as decompresses, the compressed signal 112 to output the sensor-based signal 504 and the further sensor-based signal to the processor 618. The processor 618 controls one or more components, such as the RF generator 602, the match, and the plasma chamber 604, based on the measured information of the sensor-based signal 504 and the further sensor-based signal. For example, the processor 618 increases the parameter of the RF signal 612 upon determining that the parameter of the sensor-based signal 504 is below a predetermined level. In the example, the processor 618 decreases the parameter of the RF signal 612 upon determining that the parameter of the sensor-based signal 504 is above the predetermined level.

In an embodiment, the analytical controller 608 is located within the RF sensor 606.

Broadly speaking, in a variety of embodiments, the controller is defined as electronics having various integrated circuits, logic, memory, and/or software that receive instructions, issue instructions, control operation, enable cleaning operations, enable endpoint measurements, and the like. The integrated circuits include chips in the form of firmware that store program instructions, digital signal processors (DSPs), chips defined as ASICs, PLDs, and/or one or more microprocessors, or microcontrollers that execute program instructions (e.g., software). The program instructions are instructions communicated to the controller in the form of various individual settings (or program files), defining the parameters, the factors, the variables, etc., for carrying out a particular process on or for a semiconductor wafer or to a system. The program instructions are, in some embodiments, a part of a recipe defined by process engineers to accomplish one or more processing steps during the fabrication of one or more layers, materials, metals, oxides, silicon, silicon dioxide, surfaces, circuits, and/or dies of a wafer.

Without limitation, in various embodiments, example systems to which the methods are applied include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that is associated or used in the fabrication and/or manufacturing of semiconductor wafers.

It is further noted that in some embodiments, the above-described operations apply to several types of plasma chambers, e.g., a plasma chamber including an inductively coupled plasma (ICP) reactor, a transformer coupled plasma chamber, conductor tools, dielectric tools, a plasma chamber including an electron cyclotron resonance (ECR) reactor, etc. For example, one or more RF generators are coupled to an inductor within the ICP reactor. Examples of a shape of the inductor include a solenoid, a dome-shaped coil, a flat-shaped coil, etc.

Some of the embodiments also relate to a hardware unit or an apparatus for performing these operations. The apparatus is specially constructed for a special purpose computer. When defined as a special purpose computer, the computer performs other processing, program execution or routines that are not part of the special purpose, while still being capable of operating for the special purpose.

One or more embodiments can also be fabricated as computer-readable code on a non-transitory computer-readable medium. The non-transitory computer-readable medium is any data storage hardware unit, e.g., a memory device, etc., that stores data, which is thereafter be read by a computer system. Examples of the non-transitory computer-readable medium include hard drives, network attached storage (NAS), ROM, RAM, compact disc-ROMs (CD-ROMs), CD-recordables (CD-Rs), CD-rewritables (CD-RWs), magnetic tapes and other optical and non-optical data storage hardware units. In some embodiments, the non-transitory computer-readable medium includes a computer-readable tangible medium distributed over a network-coupled computer system so that the computer-readable code is stored and executed in a distributed fashion.

Although the method operations above were described in a specific order, it should be understood that in various embodiments, other housekeeping operations are performed in between operations, or the method operations are adjusted so that they occur at slightly different times, or are distributed in a system which allows the occurrence of the method operations at various intervals, or are performed in a different order than that described above.

It should further be noted that in an embodiment, one or more features from any embodiment, described above, are combined with one or more features of any other embodiment, also described above, without departing from a scope described in various embodiments described in the present disclosure.

Although the foregoing embodiments have been described in some detail for purposes of clarity of understanding, it will be apparent that certain changes and modifications can be practiced within the scope of appended claims. Accordingly, the present embodiments are to be considered as illustrative and not restrictive, and the embodiments are not to be limited to the details given herein.

The invention claimed is:

1. A method for compressing a sensor-based signal, comprising:

receiving the sensor-based signal;

dividing the sensor-based signal into a plurality of portions, wherein each of the plurality of portions is generated according to a corresponding cycle of a clock signal;

identifying a plurality of states of each of the plurality of portions of the sensor-based signal;

dividing sensor state data for one of the plurality of states into a parameter list and a difference component, wherein the parameter list includes a value common to all of the sensor state data for the one of the plurality of states, wherein the difference component includes a plurality of values that are offsets from the common value; and packetizing the parameter list within a header of a packet and the difference component within a payload of the packet to compress the sensor state data.

2. The method of claim 1, wherein the one of the plurality of states for which the sensor state data is divided into the parameter list and the difference component is a transition state or a steady state.

3. The method of claim 1, wherein the sensor-based signal is generated based on a radio frequency (RF) signal generated by an RF generator.

4. The method of claim 1, wherein the plurality of states include two states, or three states, or four states.

5. The method of claim 1, wherein the sensor-based signal is a digital signal that is output from an analog-to-digital converter, wherein each of the plurality of portions is generated to span across the corresponding cycle of the clock signal, wherein each of the plurality of states is a transition state or a steady state.

6. The method of claim 1, wherein the sensor state data and additional sensor state data includes a plurality of first parameter values of the one of the plurality of states, a plurality of second parameter values of the one of the plurality of states, a plurality of third parameter values of the one of the plurality of states, and a plurality of fourth parameter values of the one of the plurality of states, wherein said dividing the sensor state data into the parameter list and the difference component includes:

generating the parameter list including a first statistical parameter value from the plurality of first parameter values, a second statistical parameter value from the plurality of second parameter values, a third statistical parameter value from the plurality of third parameter values, and a fourth statistical parameter value from the plurality of fourth parameter values; and generating the difference component including a first plurality of sets of differences between the plurality of first parameter values and the first statistical parameter value, a second plurality of sets of differences between the plurality of second parameter values and the second statistical parameter value, a third plurality of sets of differences between the plurality of third parameter values and the third statistical parameter value, and a fourth plurality of sets of differences between the plurality of fourth parameter values and the fourth statistical parameter value.

7. The method of claim 6, wherein the plurality of first parameter values are voltage values, the first statistical parameter value is a mean voltage value, the plurality of second parameter values are current values, the second statistical parameter value is a mean current value, the plurality of third parameter values are phases, the third statistical parameter value is a mean phase, and the plurality of fourth parameter values are frequency values, the fourth statistical parameter value is a mean frequency.

8. The method of claim 6, wherein the plurality of first parameter values are forward power values, the first statistical parameter value is a mean forward power value, the plurality of second parameter values are reverse power values, the second statistical parameter value is a mean reverse power value, the plurality of third parameter values are phases, the third statistical parameter value is a mean phase, and the plurality of fourth parameter values are frequency values, the fourth statistical parameter value is a mean frequency.

9. The method of claim 1, wherein the sensor state data and additional sensor state data includes a plurality of first parameter values of the one of the plurality of states, a plurality of second parameter values of the one of the plurality of states, a plurality of third parameter values of the one of the plurality of states, and a plurality of fourth parameter values of the one of the plurality of states, wherein said dividing the sensor state data into the parameter list and the difference component includes:

generating the parameter list including a maximum first parameter value and a minimum parameter values from the plurality of first parameter values to create a first parameter range for the one of the plurality of states, a maximum second parameter value and a minimum second parameter value from the plurality of second parameter values to create a second parameter range for the one of the plurality of states, a maximum third parameter values and a minimum third parameter value from the plurality of fourth parameter values to create a third parameter range for the one of the plurality of states, and a maximum fourth parameter value and a minimum fourth parameter from the plurality of fourth parameter values to create a fourth parameter range for the one of the plurality of states; and generating the difference component including a plurality of first parameter locations and a plurality of first parameter time windows of the plurality of first parameter locations, a plurality of second parameter locations and a plurality of second parameter time windows of the plurality of second parameter locations, a plurality of third parameter locations and a plurality of third parameter time windows of the plurality of third parameter locations, and a plurality of fourth parameter locations and a plurality of fourth parameter time windows of the plurality of fourth parameter locations, wherein the plurality of first parameter locations are with respect to the maximum first parameter value or the minimum first parameter value, the plurality of second parameter locations are with respect to the maximum second parameter value or the minimum second parameter value, the plurality of third parameter locations are with respect to the maximum third parameter value or the minimum third parameter value, and the plurality of fourth parameter locations are with respect to the maximum fourth parameter value or the minimum fourth parameter value.

10. The method of claim 9, wherein the plurality of first parameter locations are distances of voltage values from the maximum first parameter value or the minimum first parameter value, the plurality of second parameter locations are distances of current values from the maximum second parameter value or the minimum second parameter value, the plurality of third parameter locations are distances of phase values from the maximum third parameter value or the minimum third parameter value, and the plurality of fourth parameter locations are distances of frequency values from the maximum fourth parameter value or the minimum fourth parameter value.

11. The method of claim 9, wherein the plurality of first parameter locations are distances of forward power values from the maximum first parameter value or the minimum first parameter value, the plurality of second parameter locations are distances of reverse power values from the maximum second parameter value or the minimum second parameter value, the plurality of third parameter locations are distances of phase values from the maximum third parameter value or the minimum third parameter value, and the plurality of fourth parameter locations are distances of frequency values from the maximum fourth parameter value or the minimum fourth parameter value.

12. An encoder for compressing a sensor-based signal, comprising:

a processor configured to:

receive the sensor-based signal;

divide the sensor-based signal into a plurality of portions, wherein each of the plurality of portions is generated according to a corresponding cycle of a clock signal;

identify a plurality of states of each of the plurality of portions of the sensor-based signal;

divide sensor state data for one of the plurality of states into a parameter list and a difference component, wherein the parameter list includes a value common to all of the sensor state data for the one of the plurality of states, wherein the difference component includes a plurality of values that are offsets from the common value; and packetize the parameter list within a header of a packet and the difference component within a payload of the packet to compress the sensor state data; and a memory device coupled to the processor.

13. The encoder of claim 12, wherein the one of the plurality of states for which the sensor state data is divided into the parameter list and the difference component is a transition state or a steady state.

14. The encoder of claim 12, wherein the sensor-based signal is generated based on a radio frequency (RF) signal generated by an RF generator.

15. The encoder of claim 12, wherein the plurality of states include two states, or three states, or four states.

16. The encoder of claim 12, wherein the sensor-based signal is a digital signal that is output from an analog-to-digital converter, wherein each of the plurality of portions is generated to span across the corresponding cycle of the clock signal, wherein each of the plurality of states is a transition state or a steady state.

17. The encoder of claim 12, wherein the sensor state data and additional sensor state data includes a plurality of first parameter values of the one of the plurality of states, a plurality of second parameter values of the one of the plurality of states, a plurality of third parameter values of the one of the plurality of states, and a plurality of fourth parameter values of the one of the plurality of states, wherein to divide the sensor state data into the parameter list and the difference component, the processor is configured to:

generate the parameter list including a first statistical parameter value from the plurality of first parameter values, a second statistical parameter value from the plurality of second parameter values, a third statistical parameter value from the plurality of third parameter values, and a fourth statistical parameter value from the plurality of fourth parameter values; and generate the difference component including a first plurality of sets of differences between the plurality of first parameter values and the first statistical parameter value, a second plurality of sets of differences between the plurality of second parameter values and the second statistical parameter value, a third plurality of sets of differences between the plurality of third parameter values and the third statistical parameter value, and a fourth plurality of sets of differences between the plurality of fourth parameter values and the fourth statistical parameter value.

18. The encoder of claim 12, wherein the sensor state data and additional sensor state data includes a plurality of first parameter values of the one of the plurality of states, a plurality of second parameter values of the one of the plurality of states, a plurality of third parameter values of the one of the plurality of states, and a plurality of fourth parameter values of the one of the plurality of states, wherein to divide the sensor state data into the parameter list and the difference component, the processor is configured to:

generate the parameter list including a maximum first parameter value and a minimum parameter values from the plurality of first parameter values to create a first parameter range for the one of the plurality of states, a maximum second parameter value and a minimum second parameter value from the plurality of second parameter values to create a second parameter range for the one of the plurality of states, a maximum third parameter values and a minimum third parameter value from the plurality of fourth parameter values to create a third parameter range for the one of the plurality of states, and a maximum fourth parameter value and a minimum fourth parameter from the plurality of fourth parameter values to create a fourth parameter range for the one of the plurality of states; and generate the difference component including a plurality of first parameter locations and a plurality of first parameter time windows of the plurality of first parameter locations, a plurality of second parameter locations and a plurality of second parameter time windows of the plurality of second parameter locations, a plurality of third parameter locations and a plurality of third parameter time windows of the plurality of third parameter locations, and a plurality of fourth parameter locations and a plurality of fourth parameter time windows of the plurality of fourth parameter locations, wherein the plurality of first parameter locations are with respect to the maximum first parameter value or the minimum first parameter value, the plurality of second parameter locations are with respect to the maximum second parameter value or the minimum second parameter value, the plurality of third parameter locations are with respect to the maximum third parameter value or the minimum third parameter value, and the plurality of fourth parameter locations are with respect to the maximum fourth parameter value or the minimum fourth parameter value.

19. A plasma system for compressing a sensor-based signal, comprising:

a radio frequency (RF) generator configured to generate an RF signal;

a plasma chamber coupled to the RF generator via an RF communication medium; and an encoder configured to:

receive the sensor-based signal including measurement information from an RF sensor coupled to the RF communication medium;

divide the sensor-based signal into a plurality of portions, wherein each of the plurality of portions is generated according to a corresponding cycle of a clock signal;

identify a plurality of states of each of the plurality of portions of the sensor-based signal;

divide sensor state data for one of the plurality of states into a parameter list and a difference component, wherein the parameter list includes a value common to all of the sensor state data for the one of the plurality of states, wherein the difference component includes a plurality of values that are offsets from the common value; and packetize the parameter list within a header of a packet and the difference component within a payload of the packet to compress the sensor state data.

20. The plasma system of claim 19, wherein the one of the plurality of states for which the sensor state data is divided into the parameter list and the difference component is a transition state or a steady state.

* * * * *